United States Patent [19]
Knapp et al.

[11] Patent Number: 5,427,538
[45] Date of Patent: Jun. 27, 1995

[54] ELECTRICAL CONNECTING SYSTEM

[75] Inventors: Todd K. Knapp; Frank J. Muench; Henry A. Hecker, all of Waukesha; John M. Makal, Menomonee Falls; Paul M. Roscizewski, Eagle, all of Wis.; David S. Brucker, San Francisco, Calif.; Harvey W. Mikulecky, Dousman, Wis.

[73] Assignee: Cooper Industries, Inc., Houston, Tex.

[21] Appl. No.: 124,538

[22] Filed: Sep. 22, 1993

[51] Int. Cl.6 .......................................... H01R 13/62
[52] U.S. Cl. ................... 439/157; 439/160; 439/480; 439/921
[58] Field of Search ............. 439/921, 507, 509, 511, 439/512, 362, 364, 365, 480, 153, 155, 157, 160

[56] References Cited

U.S. PATENT DOCUMENTS

| | | | |
|---|---|---|---|
| 2,939,103 | 5/1960 | Agron et al. | 439/157 |
| 3,307,137 | 2/1967 | Tordoff et al. | 439/480 X |
| 3,594,685 | 7/1971 | Cunningham | 439/480 |
| 3,622,937 | 11/1971 | Bokshorn et al. | 439/511 X |
| 3,644,869 | 2/1972 | Newman | 439/153 |
| 3,835,439 | 9/1974 | Yonkers | 439/921 X |
| 3,918,786 | 11/1975 | Chaney et al. | 439/153 |
| 4,203,641 | 5/1980 | Siebens | 439/921 X |
| 4,787,855 | 11/1988 | Finke | 439/921 X |
| 4,820,183 | 4/1989 | Knapp et al. | 439/480 X |
| 4,891,016 | 1/1990 | Luzzi et al. | 439/921 |

Primary Examiner—Z. R. Blinsky
Attorney, Agent, or Firm—Burns, Doane, Swecker & Mathis

[57] ABSTRACT

A device electrically interconnects a high voltage cable to a bushing of a deadfront electrical apparatus or switchgear. The device comprises a feed-through bushing and a separate U-member. The U-member can be installed onto, or removed from, the bushings without having to disconnect the ground. A driver mechanism applies a force to the U-member at a location substantially midway between two parallel legs of the U-member for installing or removing the U-member without cocking of the legs. The U-member carries female contacts which are engageable with male contacts of the bushings.

27 Claims, 7 Drawing Sheets

ELECTRICAL CONNECTING SYSTEM

BACKGROUND OF THE INVENTION

The invention relates to methods and apparatus for making and breaking electrical connection with electrical equipment such as transformers, switchgear, or cables.

Deadfront switchgear has been replacing livefront apparatus because of the safety, lower cost and increased operability of the deadfront system. Since there is no exposed voltage, safety is increased for both the operator and the public. In addition, the ability to operate easily and efficiently either with grounded, visible break connection points or loadbreak connection points by means of hotstick operation with a one or two man crew, lessens the operating danger. The deadfront system has proven to be extremely reliable with very low failure rate.

In practice, 600 ampere T-connectors have been used in these deadfront systems because they permit deadfront connection and visible disconnection by hotstick while the device is grounded. Visible disconnection is achieved by backing the T-connector off the 600 ampere bushing with a tool operated by a shotgun stick. One of the drawbacks to the use of T-connectors, however, is the bulky and stiff 600 ampere cable attached to the T-connector which makes it difficult to handle the T-connector.

It has also been proposed to interconnect T-connectors by means of a generally U-shaped member in which the legs of the "U" carry male contacts which connect with female contacts of the T-connectors. The legs are interconnected by a buss portion which includes means for connecting a ground wire and provides access to a threaded actuator in each leg for applying the U-member to the T-connectors. This is accomplished by rotating the actuators alternately in step-by-step fashion, i.e., by advancing a first leg incrementally, and then a second leg incrementally, and then the first leg, and so on, until both legs are fully mounted on the bushings. Removal of the U-member is achieved by performing that operation in reverse. Such U-members avoid the need to insert and remove the T-connectors as often, thereby lessening the frequency at which it is necessary to manipulate the stiff 600 amp cables. However, in order to access the actuators, it is necessary to remove the ground connector from the bight portion of the U-member. This creates a danger if the system is accidentally re-energized before the ground can be re-established.

SUMMARY OF THE INVENTION

The foregoing shortcomings are overcome or alleviated by the present invention. One aspect of the present invention relates to an electrical connecting system comprising an electrical assembly which includes a stationary installation, and a U-member. The stationary installation comprises a panel and a pair of frusto-conical electrical bushings affixed to the panel. The U-member comprises a pair of parallel legs each containing a frusto-conical receptor for removably receiving a respective one of the bushings to make electrical connection therebetween. A driver is affixed to the electrical assembly and is engageable with both the stationary installation and the U-member for applying a force to the U-member at a location disposed generally midway between the legs of the U-member to selectively remove and insert the U-member with respect to the bushings.

Another aspect of the invention relates to an electrical connecting system which comprises a panel, a frusto-conical entry bushing affixed to the panel, and a feed-through bushing member affixed to the panel. The feed-through bushing member includes first and second frusto-conical feed-through bushings electrically interconnected by a buss. A U-member is provided which is comprised of parallel legs interconnected by a bight. Each leg carries a frusto-conical receptor. The receptors are interconnected by a buss disposed in the bight. The receptors are configured for removably receiving the entry bushing and the first feed-through bushing, respectively. Provision is made for connecting a power cable to the second feed-through bushing, and for grounding the power cable. A driver mechanism is provided for selectively inserting and removing the U-member with respect to the entry bushing and the first feed-through bushing while the power cable remains grounded.

Yet another aspect of the invention relates to a U-member for making electrical connection between two frusto-conical bushings of an electrical installation. The U-member comprises a pair of parallel legs, and a bight interconnecting the legs. One leg is longer than the other, and each leg includes a frusto-conical receptor for receiving one of the bushings. Each receptor includes a female contact for receiving a male contact of its respective bushing. The bight carries a buss for electrically interconnecting the receptors. Preferably, a driver member is mounted generally midway between the legs for applying a force for selectively removing and inserting the U-member relative to the bushings. Preferably, the bight is configured to pass around the driver member.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
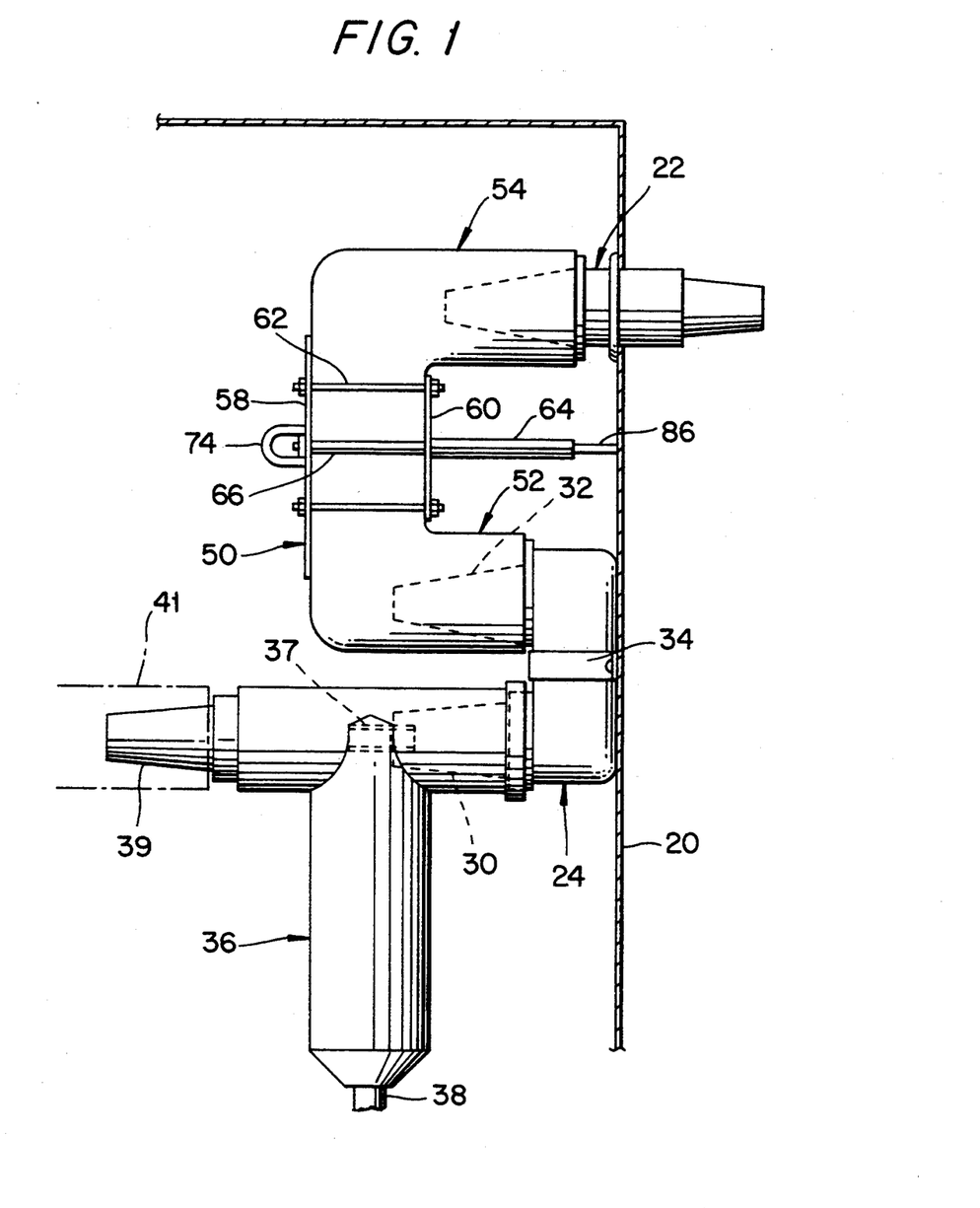
FIG. 1 is a side elevational view of an electrical connecting system according to the present invention; a U-member of that system carries a first embodiment of a driver mechanism.

A deadfront 600 amp switchgear of the type contemplated herein is generally housed within an enclosure formed by steel support plates located within the switchgear package. A deadfront barrier or front panel 20 which is a part of the enclosure for the switchgear is shown in FIG. 1 with the electrical connecting system being mounted on the wall 20. In this regard, the electrical connecting system includes an apparatus or entry bushing 22 and a feed-through bushing member 24 mounted on the front plate 20. The feed-through bushing member 24 comprises first and second bushings 30,32 interconnected electrically by a buss 34. A T-connector 36 is coupled to a cable 38 and mounted on one of the bushings 30 of the feed-through bushing member 24.

The T-connector 36 may be a conventional T-connector, such as a T-OP II ™ connector sold by the present assignee. The T-connector 36 can be connected to the bushing 30 by a bolt assembly 37 by means of a shotgun stick (not shown) which is inserted through a 200 amp tap bushing 39 of the T-connector.

The tap bushing 39 of the T-connector provides access for performing live voltage testing of the terminator, or for grounding the cable 38, among other functions. The member 41 connected to the tap 39 in FIG. 1 represents any one of: a grounding elbow, an insulative protective cap, a lightning arrester, or any 200 amp connection, for example.

Thus, a lineman can check to see if the system is de-energized before connecting or disconnecting the entry bushing 22 relative to the bushing 32 of the feed-through bushing member 24, such connection being made by a U-member 50.

Figure 2:
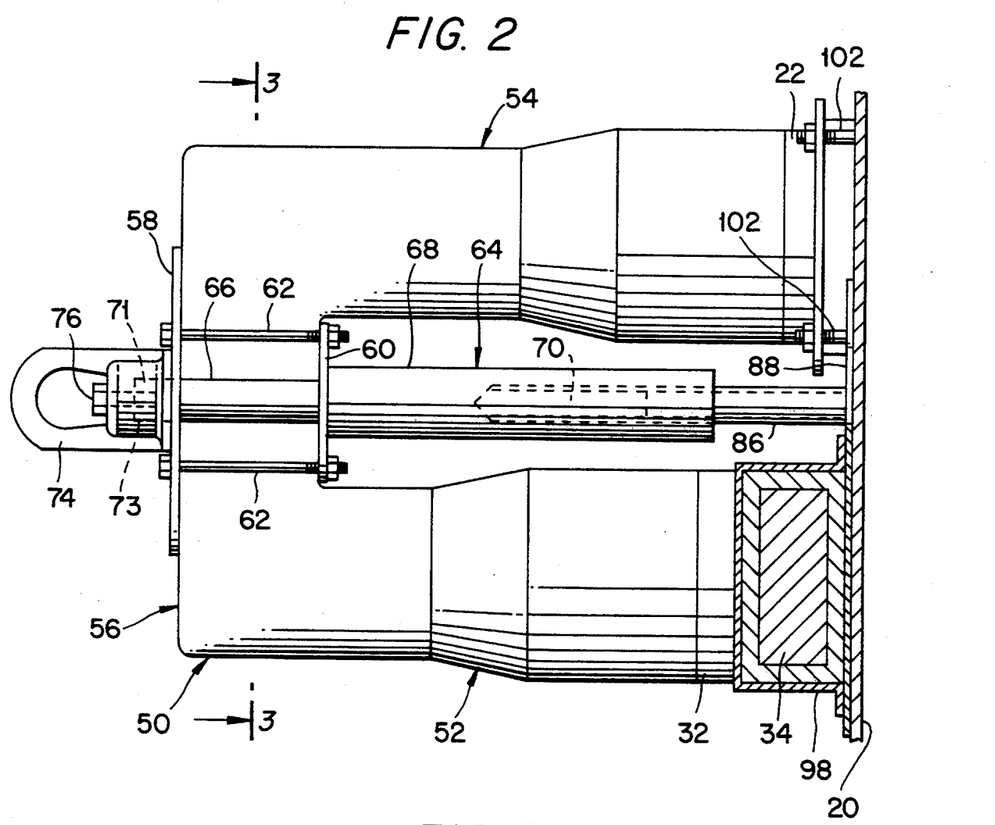
FIG. 2 is a sectional view taken along line 2—2 of FIG. 5.
Figure 3:
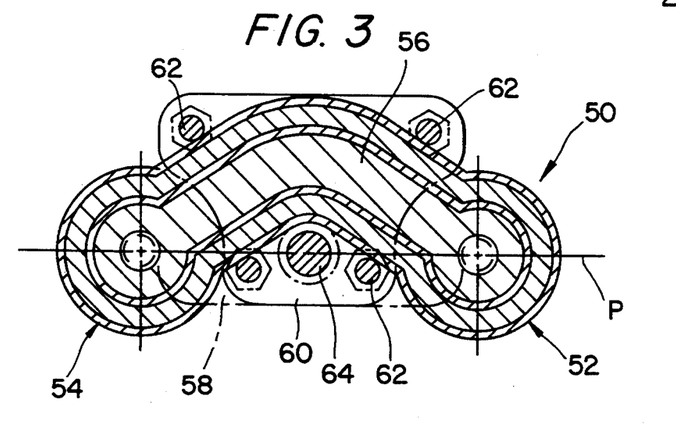
FIG. 3 is a cross sectional view taken along line 3—3 in FIG. 2.

With reference to FIG. 2, the U-member 50 is in the form of a U-shaped double female interface boot member having two female boot or receptor sections 52,54 interconnected by a buss 56. The receptors 52,54 define legs of the "U" which are interconnected by a buss 56. The buss 56 is curved, as shown in FIG. 3 so as to extend out of a plane P carrying the longitudinal axes of both receptors 52,54. Mounted on opposite sides of the buss 56 are first and second saddle plates 58,60 which are held together by a set of bolts 62. Those plates carry a driver or release mechanism in the form of a rotatable shaft 64 having small and large diameter sections 66,68. The small diameter section 66 extends through, and is rotatably supported in, aligned holes in the plates 58,60.

Figure 4:
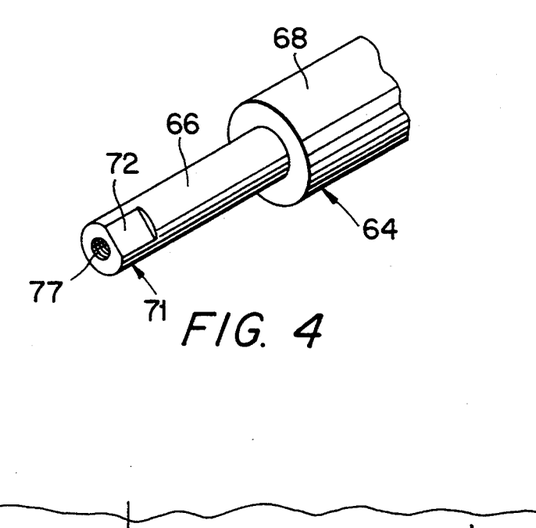
FIG. 4 is a fragmentary perspective view of a driver member depicted in FIG. 1.

The large diameter section 68 abuts against the second plate 60 and has a threaded opening 70 at its front end. A rear end 71 of the small diameter section 66 has a flat 72 (see FIG. 4). Attached to that rear end 71 is a hook eye 74 which includes a hole 73 that receives the rear end 71. The hole has a flat side corresponding to the flat 72 so that relative rotation between the hook eye and shaft 64 is prevented when the end 71 of the shaft is inserted into the hole 73. A screw 76 is inserted through the hook eye 74 (see FIG. 2) and is threaded in an opening 77 formed in the rear end 71 of the shaft to attach the hook eye 74 to the driver shaft 64. It will be appreciated that the driver shaft 64 is free to rotate about its longitudinal axis, but is constrained against longitudinal movement relative to the U-member 50 due to contact of the hook eye 74 with the plate 58 and by contact of the large diameter portion 68 with the plate 60.

The hook eye 74 is configured to be manipulated by a standard shotgun stick to enable the U-member to be positioned in place.

The threaded opening 70 in the shaft 64 is configured to receive a threaded push-pull stud 86 mounted on the front panel, so that when the hook eye 74 is rotated in one direction, the U-member 50 is pulled toward the front panel 20, and when the hook eye 74 is rotated in the opposite direction, the U-member is pushed away from the front panel.

The stud 86 is affixed to a mounting bracket 88 which is attached to the front panel 20 by suitable means, such as by fasteners and/or welding. Attached to the mounting bracket 88 is the feed-through bushing member 24 having its two bushings 30,32 arranged in horizontally spaced relationship, rather than in vertically spaced relationship shown in FIG. 1. An affixing bracket 98 secures the feed-through bushing member 24 to the mounting bracket 88 by means of studs 89 shown in FIG. 5.

Figure 5:
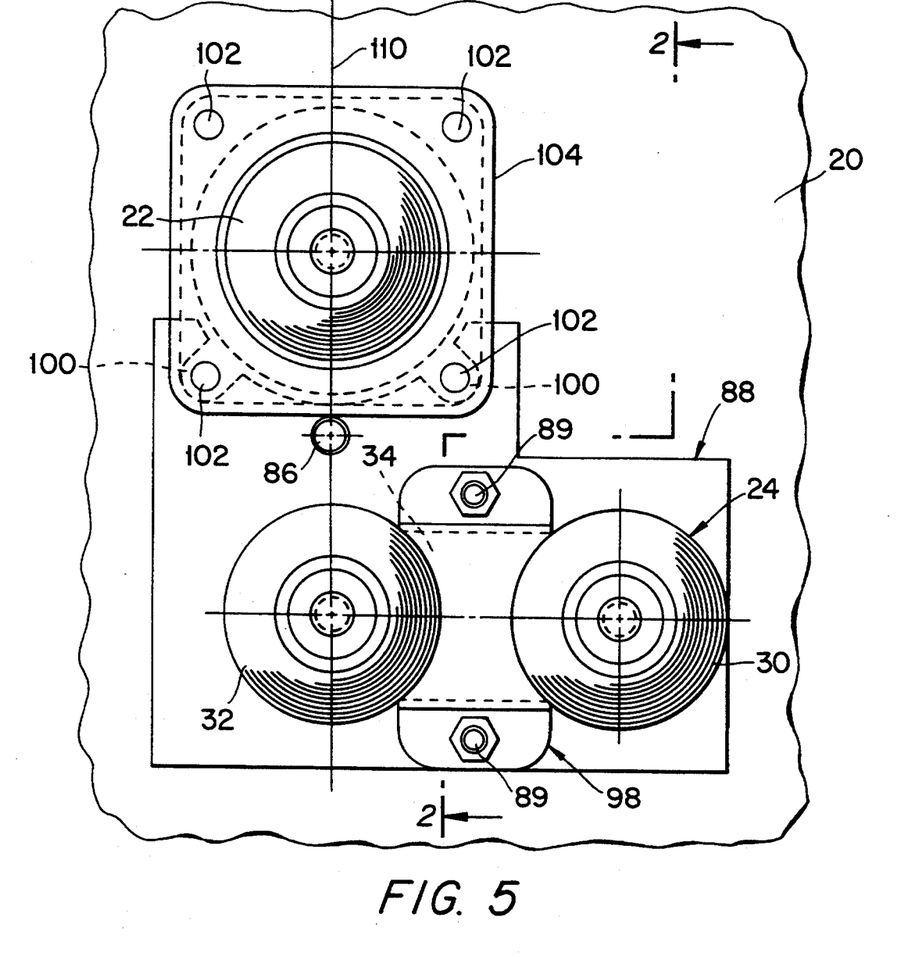
FIG. 5 is a front elevational view of a bushing arrangement mounted on a panel, with two bushings of a feed-through bushing member being spaced horizontally apart in contrast to being spaced vertically apart in FIG. 1.

The mounting bracket 88 includes slots 100 for receiving the studs 102 that secure a bushing clamp plate 104 to the front panel. The clamp plate 104 clamps the apparatus bushing 22 to the front panel. It will be appreciated that the mounting bracket 88 serves to locate the stud 86 in a predetermined relationship to the apparatus bushing 22 as well as the first bushing 32 of the feed-through bushing member 24, the stud 86 being located midway between those bushings 22, 32.

Accordingly, when the U-member 50 is located such that its receptors 54,52 are aligned with the bushings 22,32, respectively, and the stud 86 is received in the opening 70 of the driver shaft, the driver shaft 64 can be rotated by means of a shotgun stick engaging the hook eye 74 to displace the U-member toward or away from the bushings 22,32. Since the stud 86 is located substantially midway between the axes of those bushings 22,32, the receptors 52,54 of the U-member 50 will travel uniformly along the bushings 22,32, thereby preventing a cocking of the U-member.

If a previously-installed U-member 50 is being removed, then the driver shaft 64 is rotated to forcefully push the U-member off the bushings 22,32 and break any adherence which may have developed therebetween.

In practice, the mounting bracket 88 is affixed to the front panel 20, and the clamping plate 104 clamps the apparatus bushing 22 to the front panel 20 such that the stud 86 is located on the center line 110 substantially midway between the axes of the bushings 22,32.

The T-connector 36 is then connected to the second busing 30 of the feed-through bushing member 24, and a grounding elbow 41 is attached to the tap bushing 39 of the T-connector. The entry bushing 22 can then be electrically coupled to the feed-through bushing member 24 by means of the U-member 50. The U-member is attached by means of a conventional shotgun stick which is manipulated to loosely position the receptors 52,54 of the U-member 50 on the bushings 22,32. Simultaneously, the stud 86 will be loosely positioned on the opening 70 in the driver shaft 64. By rotating the driver shaft in one direction, the receptors 52,54 of the U-member 50 are pulled onto the bushings 22,32 without becoming cocked. When it is desired to remove the U-member, the driver shaft 64 is rotated in the opposite direction, whereby a forced separation of the driver shaft from the stud causes the U-member to be pushed off the bushings 22,32 without becoming cocked. Thus, the electrical disconnection can be made relatively easily even if the U-member has become stuck to the bushings. Moreover, the electrical connection and disconnection can be made safely, because it is unnecessary to disconnect the ground 41.

Instead of the buss 56 being curved around the drive shaft 64 in the manner depicted in FIG. 3, the buss could be split into upper and lower portions (not shown) with the driver shaft extending between those two portions.

It will be appreciated that the U-member 50 has been characterized as a "U" even though one of the legs 54 is longer than the other leg 52. The exact shape of the U-member depends upon the relationship of the bushings 22,32; thus, by U-member is meant a member having two parallel legs interconnected by a bight portion.

Figure 6:
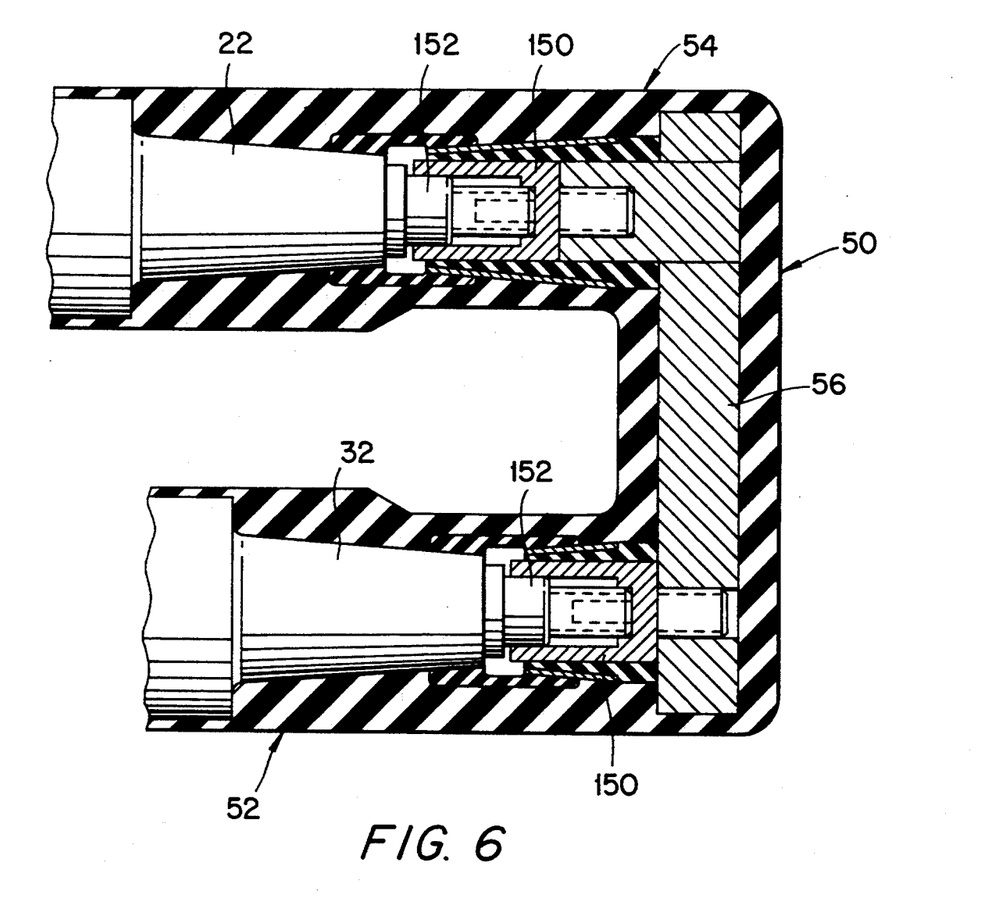
FIG. 6 is a longitudinal sectional view taken through a U-member according to the present invention.
Figure 7:
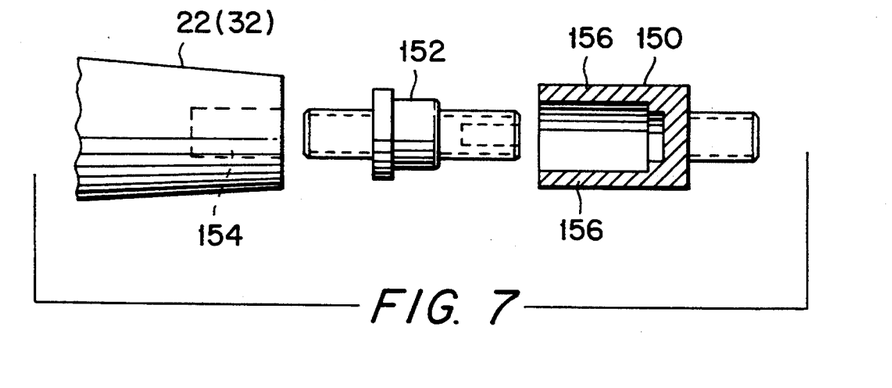
FIG. 7 is an exploded view of a conventional bushing, adaptor stud for the bushing, and female contact of the U-member.

Each receptor 52,54 of the U-member 50 contains a female type of electrical contact 150 (see FIGS. 6, 7) which is screw-threaded into the buss 56. By using female type contacts 150, the U-member 50 can be connected to bushings 22,32 of conventional design, provided those bushings are provided with male adapter studs 152 screw-threaded into threaded holes 154 formed in the front ends of the bushings. The female contacts 150 are conventional tulip contacts which possess circumferentially spaced fingers 156 (e.g., four or six fingers) that elastically grip a stud 152.

Figure 8:
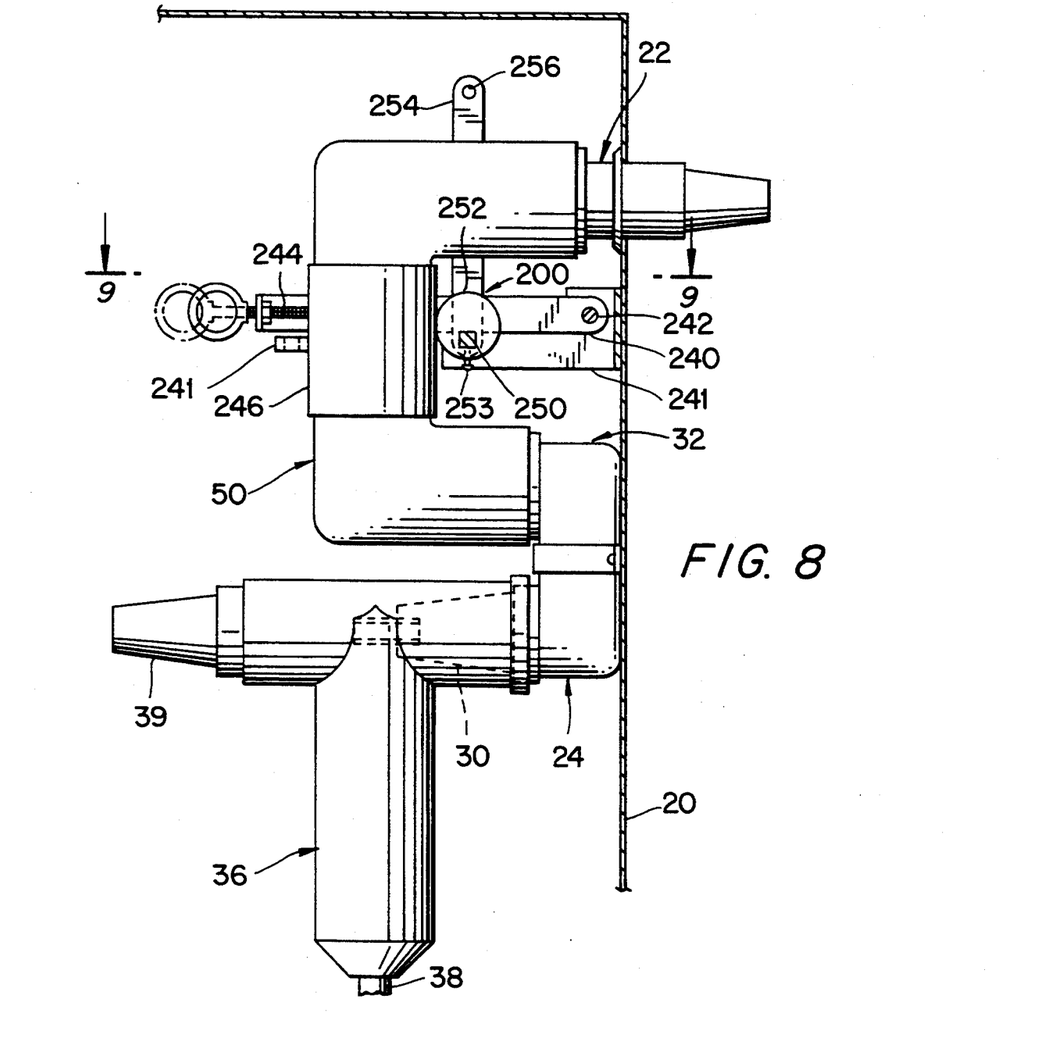
FIG. 8 is a view similar to FIG. 1 depicting a second embodiment of a driver mechanism according to the present invention, with the U-member in a fully installed condition.
Figure 9:
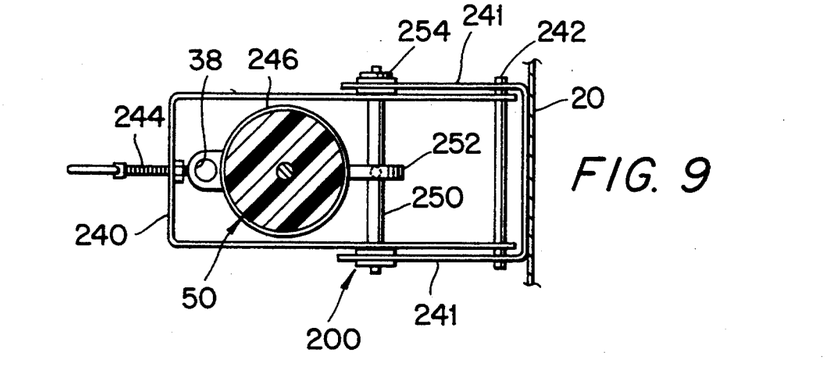
FIG. 9 is a sectional view taken along line 9—9 in FIG. 8.
Figure 10:
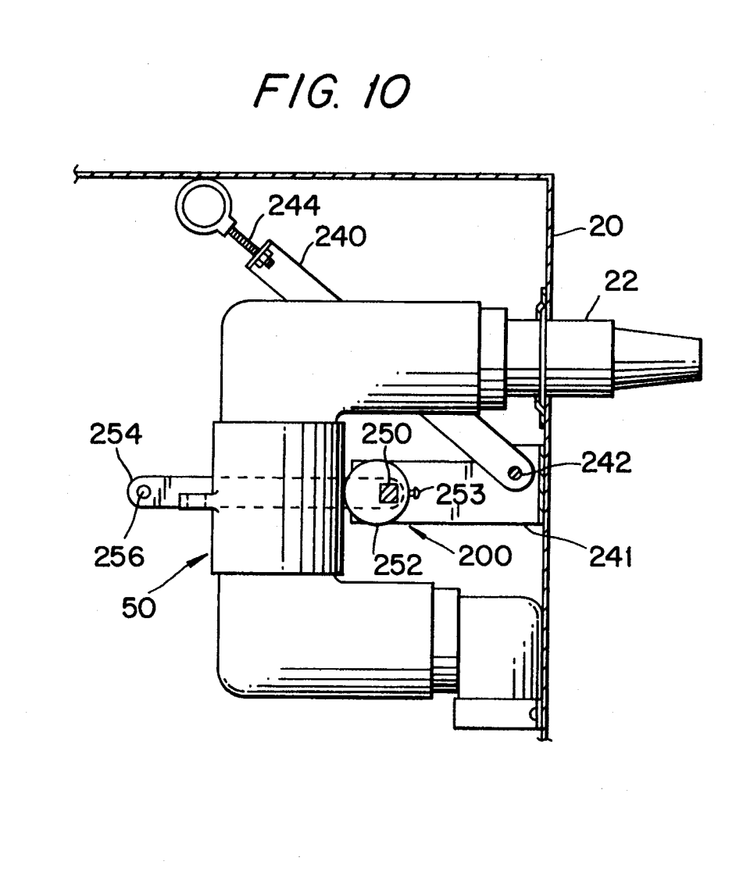
FIG. 10 is a fragmentary view similar to FIG. 8 after the driver mechanism has been moved to a position partially removing the U-member.

Another preferred mechanism 200 for moving a U-member onto or from the bushings 22,32 is depicted in FIGS. 8–10. That mechanism 200 comprises a bail 240, which is pivotally mounted on a pin 242 supported in brackets 241 on the front of the panel 20 for movement from a secure position as seen in FIG. 8 to a release position shown in FIG. 10. A locking bolt 244 is provided on the bail 240 which is turned into engagement with the U-member 50 to seat the U-member firmly on the bushings. Means can be provided for providing a solid surface to engage the bolt 244, such as a cylindrical metallic member 246 mounted on the outside surface of the U-member 50.

In accordance with the present invention, the U-member 50 is initially dislodged or broken away from the bushings by means of a driver or mechanical release mechanism 200. The release mechanism 200 includes a rod 250 which is mounted for pivotal movement in support bracket 241. An eccentric cam 252 is secured to the rod 250 by means of a screw 253. The cam 252 is located to connect the U-member 50 at a location approximately midway between the legs thereof. A lever arm 254 is mounted on one end of the rod 250 and includes a hookstick opening 256 on the outer end.

Means are provided to prevent actuation of the release mechanism until the U-member 50 has been released from the bail 240. This has been achieved by locating the bail 240 in a position to block movement of the lever arm 254 until the bail 240 has been moved to the upper position.

After the bail 240 has been pivoted to the upper position (FIG. 10), the lever arm 254 can be pulled forward by engaging the opening 256 with a hookstick and pulling the lever arm away from the panel 20. The pivotal motion of the lever arm 254 will rotate rod 250 causing the eccentric cam 252 to bear against the cylinder 246 at the center of the U-member for camming the U-member off of the bushings. The combination of the lever arm 254 and the eccentric cam 252 provides a very high push-out force against the U-member which will break any bonds which may have formed between the U-member 50 and the bushings.

Figure 11:
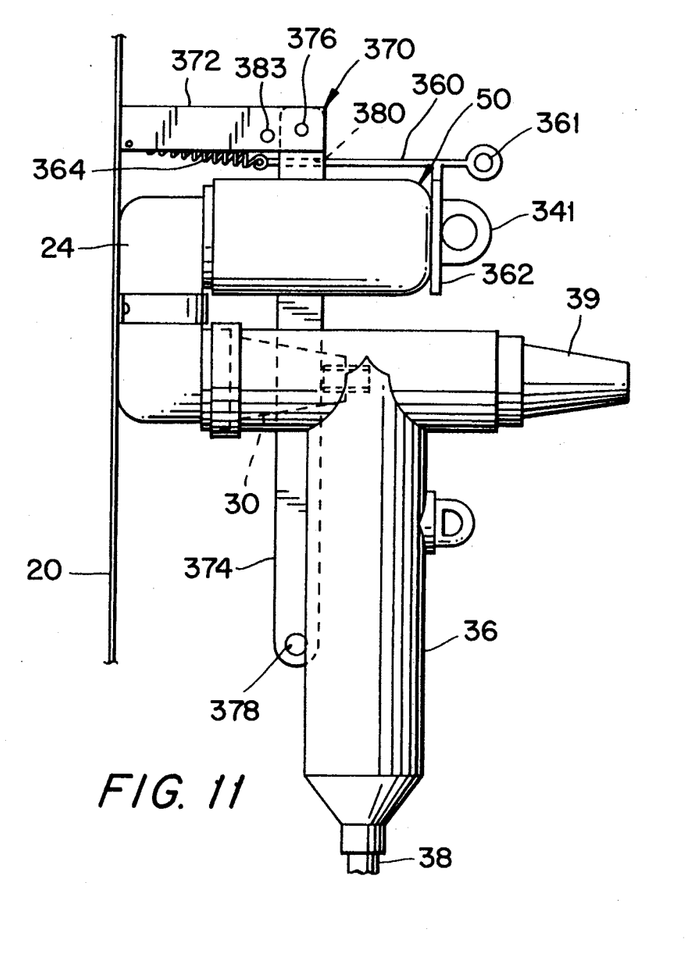
FIG. 11 is a side elevational view of an electrical connecting system according to the present invention depicting a third embodiment of a driver mechanism according to the present invention, with the U-member depicted in a fully installed condition.
Figure 12:
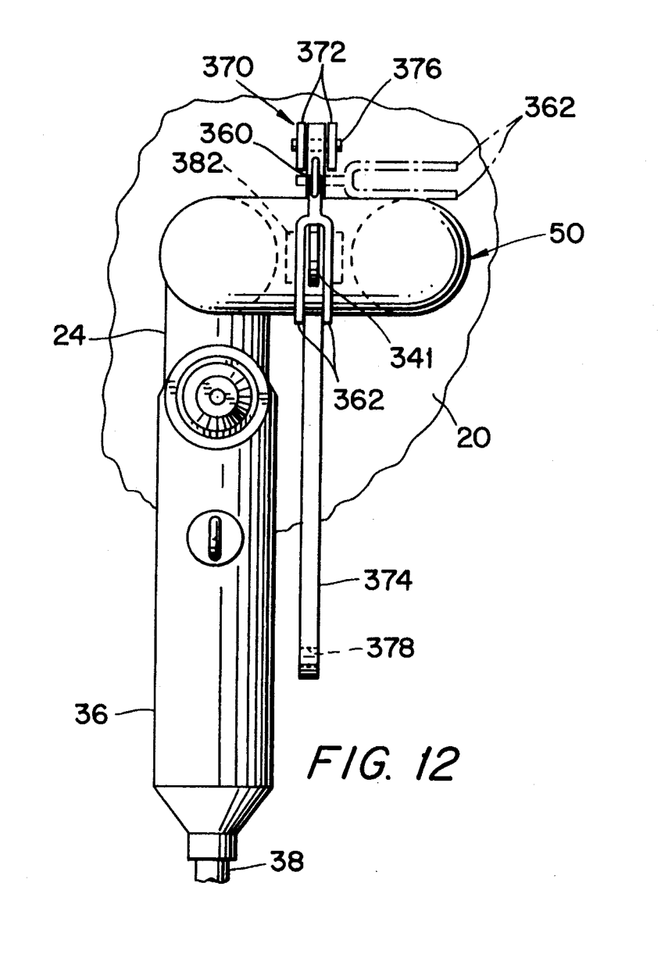
FIG. 12 is a front elevational view of the apparatus depicted in FIG. 11.
Figure 13:
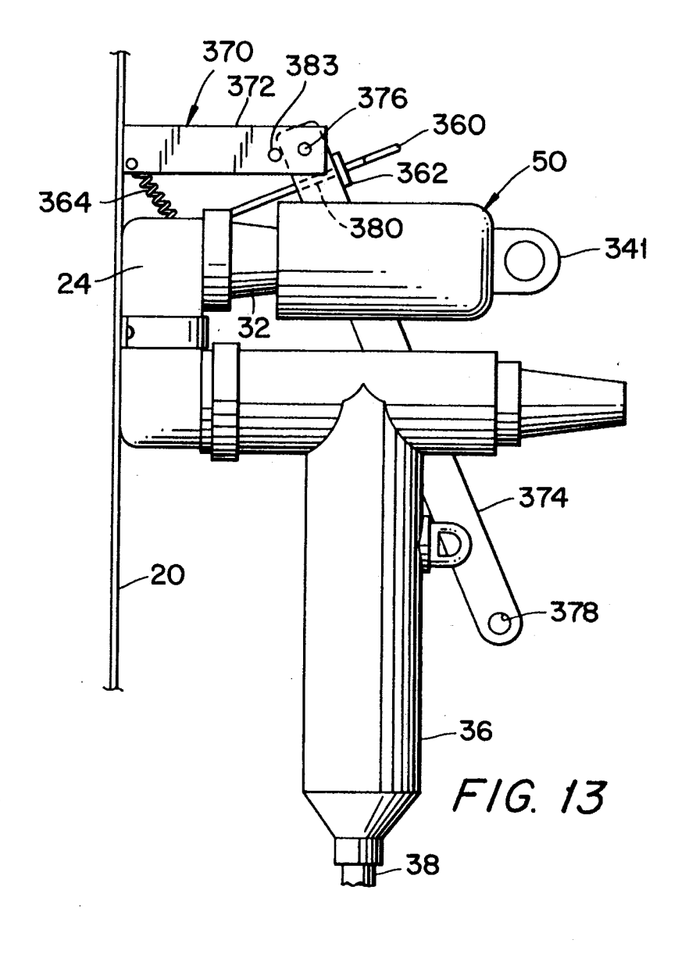
FIG. 13 is a view similar to FIG. 11 after the driver mechanism has been actuated to partially remove the U-member.

Another alternate embodiment of the invention is shown in FIGS. 11–13 wherein the U-member 50 lies in a horizontal plane and is retained or locked onto the bushings 22,32 by means of a bail 360 having fingers 362 which straddle a pull ring 341 on the U-member 50. The bail is biased by means of a spring 364 connected to the wall 20 to hold the bail in the lock position. The U-member 50 is dislodged from the bushings by means of a driver or release mechanism 370.

In this regard, the release mechanism 370 includes a bracket 372 mounted on the wall 20 and an elongated lever 374 pivotally connected to the bracket 372 by means of a pin 376. A hookstick opening 378 is provided at the end of the lever 374. The bail 360 can be mounted in an opening 380 provided in the lever 374 or supported on the bracket 372.

The bail is removed by inserting a hookstick into the eye 361 on the end of the bail and pulling the bail outward until it clears the pull ring 341. The bail is then rotated to the position shown in FIG. 13 and released. The bail will be pulled toward the wall 20.

Once the bail has cleared the U-member, a hookstick can be inserted into the opening 378 at the end of the lever arm 374 and pulled outward to cam the U-member off the bushings. The U-member is protected from damage engagement with the lever by means of a plate 382 provided on the lever 374 in a position to bear against the surface of the U-member. The U-member is prevented from being completely pushed off the bushings by the lever 374 by means of a pin 383 provided on bracket 372. The pin limits the amount of travel of the lever 374.

It will be appreciated that the present invention enables electrical connection between two bushings to be made or broken by means of a U-member without disconnecting a ground and without the U-member becoming cocked. Also, a novel U-member is provided which carries female (or male) contacts and has a buss configured to pass around a driver element. In addition, a locating arrangement between the bushings enables the bushings to be properly positioned with respect to one another and a driver element.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. An electrical connecting system, comprising:
   an electrical assembly including:

a stationary installation comprising a panel and a pair of frusto-conical electrical bushings affixed to said panel, and a U-member comprising a pair of parallel legs each containing a frusto-conical receptor for removably receiving a respective one of said bushings to make electrical connection between said bushings, and driver means affixed to said electrical assembly and engageable with both said stationary installation and said U-member for applying a force to said U-member at a location disposed generally midway between said legs to selectively remove and insert said U-member with respect to said bushings, said driver means comprising a driver member in the form of a shaft carried by said U-member and engageable with a push-pull element mounted on said panel, said buss of said U-member being curved to pass around said shaft.

2. An electrical connecting system according to claim 1, wherein said driver member is connectable to and detachable from said push-pull element in response to rotation of said driver member.

3. An electrical connecting system according to claim 2, wherein said driver member and push-pull element are connectable by screw threads.

4. An electrical connecting system according to claim 3, wherein said driver member is rotatable about a longitudinal axis and constrained against longitudinal movement relative to said receptors of said U-member.

5. An electrical connecting system according to claim 3, wherein said push-pull element is disposed substantially midway between said pair of bushings.

6. An electrical connecting system according to claim 5, wherein said driver member is connected to a hook eye for rotation therewith.

7. An electrical connecting system according to claim 1, including a mounting bracket connected to said front panel, said mounting bracket defining a locating member for locating said push-pull element in a predetermined relationship relative to said pair of bushings.

8. An electrical connecting system according to claim 1, wherein said driver member is detachable from said U-member.

9. An electrical connecting system according to claim 1, including saddle plates mounted on opposite sides of said buss of said U-member, said shaft being supported by said saddle plates.

10. An electrical connecting system according to claim 9, wherein said shaft extends through holes in said saddle plates, one end of said shaft being connectable to said push-pull element, and a hook eye connected to another end of said shaft.

11. An electrical connecting system according to claim 1, wherein said stationary installation comprises an entry bushing, and a feed-through bushing member comprising first and second feed-through bushings electrically interconnected by a buss, said entry bushing and said first feed-through bushing constituting said pair of bushings to which said U-member is connected.

12. An electrical connecting system according to claim 1, wherein said driver means is affixed to said panel and engageable with said U-member.

13. An electrical connecting system according to claim 12, said driver means comprises cam means disposed adjacent to said U-member for applying forces thereto for removing said U-member from said pair of bushings.

14. An electrical connecting system according to claim 1, wherein one of said legs is longer than the other.

15. An electrical connecting system, comprising:
an electrical assembly including:
a stationary installation comprising a panel and a pair of frusto-conical electrical bushings affixed to said panel, and a U-member comprising a pair of parallel legs each containing a frusto-conical receptor for removably receiving a respective one of said bushings to make electrical connection between said bushings, and driver means affixed to said electrical assembly and engageable with both said stationary installation and said U-member for applying a force to said U-member at a location disposed generally midway between said legs to selectively remove and insert said U-member with respect to said bushings, wherein said stationary installation comprises an entry bushing, and a feed-through bushing member comprising first and second feed-through bushings electrically interconnected by a buss, said entry bushing and said first feed-through bushing constituting said pair of bushings to which said U-member is connected.

16. An electrical connecting system according to claim 15 including means for connecting a grounding device to said second feed-through bushing during removal and installation of said U-member with respect to said pair of bushings.

17. An electrical connecting system according to claim 16 including a T-member removably connected to said second feed-through bushing, a cable attached to said T-member, said grounding means being connected to said T-member.

18. An electrical connecting system according to claim 15 including a mounting bracket attached to said panel, said feed-through bushing member being carried by said mounting bracket, said mounting bracket carrying at least a portion of said driver means, said mounting bracket including locating means for locating said bracket in a predetermined relationship to said entry bushing so that said portion of said driver means is located for ensuring that said driver means applies forces to said U-member at a location substantially midway between said legs.

19. An electrical connecting system according to claim 18, wherein said portion of said driver means comprises a threaded stud, said driver means further comprising a member carried by said U-member and screw-threadedly connected to said stud, said stud being positioned on said mounting bracket so as to be located substantially midway between said entry bushing and said first feed-through bushing.

20. An electrical connecting system according to claim 19 including a clamp plate for clamping said entry bushing to said panel by bolts, said locating means on said mounting bracket comprising slots for receiving at least two of said bolts.

21. An electrical connecting system, comprising:
an electrical assembly including:
a stationary installation comprising a panel and a pair of frusto-conical electrical bushings affixed to said panel, and a U-member comprising a pair of parallel legs each containing a frusto-conical receptor for removably receiving a respective one of said bushings to make electrical connection between said bushings, and driver means affixed to said panel and engageable with said U-member for applying a force to said U-member at a location disposed generally midway between said legs to selectively remove and insert said U-member with respect to said bushings, said driver means comprising cam means disposed adjacent to said U-member for applying a force thereto for removing said U-member from said pair of bushings, and a lever carrying means for applying a force to said U-member for inserting said U-member onto said pair of bushings.

22. An electrical connecting system according to claim 21, wherein said means for applying a force comprises a threaded bolt.

23. An electrical connecting system comprising:
a panel,
a frusto-conical entry bushing affixed to said panel,
a feed-through bushing member affixed to said panel and including first and second frusto-conical feed-through bushings electrically interconnected by a buss,
a U-member comprised of parallel legs, each leg carrying a frusto-conical receptor, said receptors being interconnected by a buss, said receptors configured for removably receiving said entry bushing and said first feed-through bushing, respectively,
means attached to said second feed-through bushing for connecting a power cable to said second feed-through bushing, and for grounding said power cable, and
driver means for selectively inserting and removing said U-member with respect to said entry bushing and said first feed-through bushing while said power cable remains grounded.

24. An electrical connecting system according to claim 23, wherein said driver means is arranged to be engageable with both said panel and said U-member for applying force to said U-member generally midway between said legs.

25. An electrical connecting system according to claim 23, wherein said driver means comprises first and second screw-threaded members carried by said U-member and panel, respectively, said screw-threaded members being interconnected to applying a force to said U-member at a location generally midway between said legs.

26. An electrical connecting system, comprising:
an electrical assembly including:
a stationary installation comprising a panel and a pair of frusto-conical electrical bushings affixed to said panel, and
a U-member comprising a pair of parallel legs each containing a frusto-conical receptor for removably receiving a respective one of said bushings to make electrical connection between said bushings, and driver means affixed to said panel and engageable with said U-member for applying a force to said U-member at a location disposed generally midway between said legs to selectively remove and insert said U-member with respect to said bushings, said driver means comprising cam means disposed adjacent to said U-member for applying a force thereto for removing said U-member from said pair of bushings, wherein said cam is actuated by a lever, said lever carrying a spring-biased element movable into engagement with said U-member for inserting said U-member onto said pair of bushings.

27. A U-member for making electrical connection between two frusto-conical bushings of an electrical installation, said U-member comprising:
a pair of parallel legs, one leg being longer than the other, each leg including a frusto-conical receptor for receiving one of said bushings, each receptor including a female contact for receiving a male contact of its respective bushing,
a buss for electrically interconnecting said receptors, and
a driver member mounted generally midway between said legs for applying a force for selectively removing and inserting said U-member relative to said bushings, said buss configured to pass around said driver member.

* * * * *